Nov. 14, 1939.  N. C. McBIRNEY  2,179,512

PIEPAN

Original Filed Oct. 10, 1936

Inventor:
Nettie C. McBirney

By
McCanna, Wintercorn & Morebach
Attys

Patented Nov. 14, 1939

2,179,512

UNITED STATES PATENT OFFICE 2,179,512

PIEPAN

Nettie C. McBirney, Tulsa, Okla.

Original application October 10, 1936, Serial No. 104,929. Divided and this application October 8, 1938, Serial No. 233,943

9 Claims. (Cl. 53—6)

This invention relates to a new and improved piepan and has for its principal object the provision of a piepan incorporating a wire bottom in a sheet metal pan, as distinguished from a wire article reinforced with a sheet metal flange or other type of framework, like those heretofore proposed, whereby to retain all of the advantages derived with wire construction without certain disadvantages.

This application is a division of my application Serial No. 104,929, filed October 10, 1936 and which has eventuated in Patent Number 2,135,-782, dated Nov. 8, 1938.

My invention is illustrated in the accompanying drawing, in which—

The same reference numerals are applied to corresponding parts throughout the views.

Figure 1:
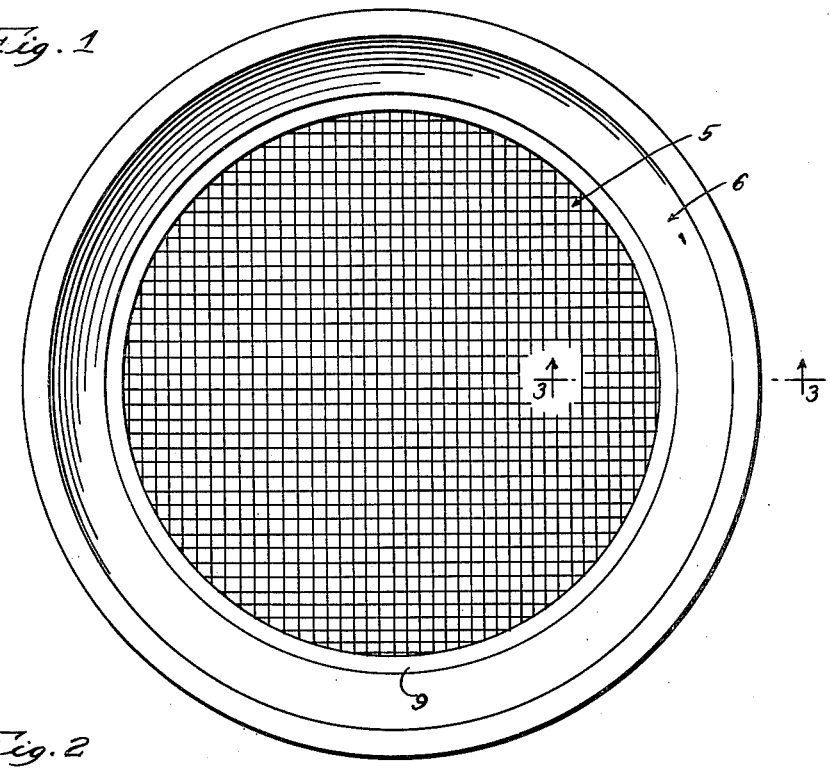
Figs. 1 and 2 are a top view and side view, respectively, of a piepan embodying my invention.
Figure 2:
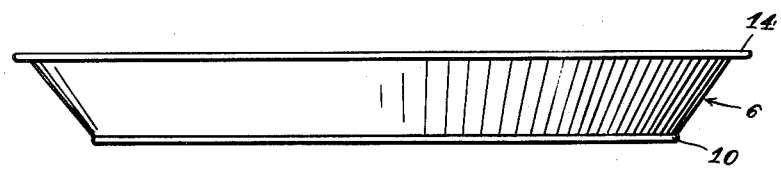

It is evident in the drawing that I have inserted a wire bottom 5 in a sheet metal pan 6, thus retaining the rigidity of the ordinary one-piece sheet metal pan while obtaining the advantages going with the use of wire screen in an article of this kind. The sheet metal is simply punched out from the bottom of the pan 6, as at 7, next to the S section 8 formed in the sheet metal, the top of which provides an annular ledge or shoulder 9, whereby to provide not only a reenforcing rim 10 and flange 11 for the pan to rest and slide on, but also a place wherein the cut edges of the wire bottom 5 may be clinched, as at 12. The upper annular flange 13 projecting outwardly affords reenforcement in addition to that afforded by the rim 10, so that there is no danger of the pan getting bent out of shape in service. The outer edge of the flange 13 is curled to provide a rounded edge which adds further reenforcement. The fact that the pan rests on the flange 11 relieves the wire bottom 5 of wear and tear. The sheet metal used in the pan may be tin, aluminum, or any other metal suitable for the purpose.

In use, it is apparent that the wire bottom 5 allows the pie to bake from both top and bottom, because of the free circulation of air, thus insuring one of a crispy, well done crust. Incidentally, I have found in using pans of this construction that the cooking time is reduced approximately twenty-five percent (25%), so that an appreciable saving in pie baking is also realized. This free circulation of air is also of advantage because it is possible to keep a pie in a pan for an indefinite time without having that "close" flavor and moist under-crust that comes with standing in any piepan, even the glass ones. The air circulation eliminates the possibility of a soggy crust, which it is the aim of every good cook to avoid. Now, by reason of the fact that I have retained the structure of an ordinary tin piepan throughout the side walls down to the bottom of the pan and merely inserted the wire bottom, as herein disclosed, I have obtained all of the advantages going with the use of wire without sacrificing the structural strength and rigidity of the ordinary tin pan which a wire pan does not possess, even though reenforced in one way or another, as heretofore proposed. A pie baked in this pan will have a firm upstanding side wall, so that the piece of pie will not "lop" as it does in the case of an all-wire pan. Moreover, with my construction, the cost of production is kept to a minimum, so that this sheet metal pan with the wire bottom inserted is made available to the housewife at a small fraction of the cost of these other piepans of wire construction mainly.

Figure 3:
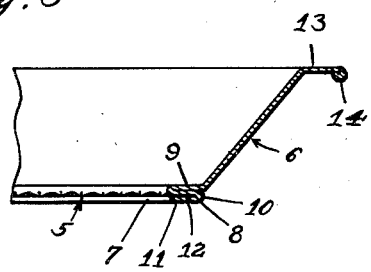
Fig. 3 is a sectional detail on the line 3—3 of Fig. 1.
Figure 4:
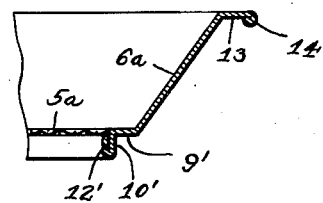
Fig. 4 is a section similar to Fig. 3 showing another construction.

In the construction shown in Fig. 4, there is a similar screen bottom 5a in a sheet metal pan 6a. The annular ledge or shoulder 9' is similar to the shoulder 9 in Fig. 3, but has an annnuar rim 10' of U-shaped cross-section projecting downwardly from its inner edge at right angles thereto, and it is in this U section that the outer edge of the screen 5a is clinched. The screen, it will be noticed, is in the same plane with the annular ledge 9'. The rim 10' greatly stiffens the pan and serves also as the supporting rim on which the pan rests and is slidable. Generally speaking, a pan of this construction offers the same advantages as the one previously described; it retains the structural strength and rigidity of the ordinary all metal piepan, and at the same time offers the advantages of a wire piepan without the disadvantages to which previous pans of such construction have been subject.

I claim:

1. A piepan of the character described comprising a main body frame of sheet metal formed to provide complete outwardly inclined upstanding side walls with an outwardly projecting rim on the upper edge, the bottom portion of said side walls being formed to provide an inwardly projecting substantially horizontal annular shoulder, the sheet metal at the inner edge of said annular shoulder being bent downwardly and outwardly and then inwardly again to a substantially S cross-section, and a wire mesh bottom for said pan having its outer edges projecting betaween the outwardly and inwardly bent portions of said S section and clinched by compression of the S section in place therebetween, the S section forming a supporting rim for the pan with the screen in elevated relation to the surface on which the pan rests and is slidable.

2. A piepan of the character described comprising a shape retaining circular sheet metal rim adapted to shape and support the side walls of a pie baked in the pan, and a circular screen bottom to support the pie and permit air circulation to the bottom thereof, the lower edges of said sheet metal rim being bent inwardly, then downwardly and outwardly and downwardly and inwardly again to define an S cross-section in one of the folds of which the outer edges of said screen are inserted and clinched by compression of the S section to secure the screen permanently in assembled relation to the rim.

3. A piepan of the character described comprising a main body frame of sheet metal formed to provide complete outwardly inclined upstanding side walls with an outwardly projecting rim on the upper edge, the bottom portion of said side walls being formed to provide an inwardly projecting substantially horizontal annular shoulder, and a wire mesh bottom for said pan disposed horizontally in substantially the same plane with said annular shoulder, the sheet metal at the inner edge of the annular shoulder being bent downwardly and outwardly under the shoulder to define a support rim for the pan and also a means for securing the outer edges of said screen, the edges of said screen being secured thereto.

4. A piepan of the character described comprising a shape retaining circular sheet metal rim adapted to shape and support the side walls of a pie baked in the pan, a circular screen bottom to support the pie and permit air circulation to the bottom thereof, and a combination supporting rim for said pan and clincher rim for said screen on the bottom of the aforesaid rim, of substantially S cross-section having the edges of the screen bottom inserted in the folds of said section and clinched by the closing thereof.

5. A piepan of the character described comprising a main body frame of sheet metal formed to provide complete outwardly inclined upstanding side walls with an outwardly projecting rim on the upper edge, the bottom portion of said side walls being formed to provide an inwardly projecting substantially horizontal annular shoulder, the sheet metal at the inner edge of said annular shoulder being bent downwardly and then inwardly and upwardly to define a U cross-section, and a wire mesh bottom for said pan having its outer edges projecting between the downwardly and upwardly projecting portions of said U section and clinched by compression of said U section in place, the U section forming a supporting rim for the pan with the screen in elevated relation to the surface on which the pan rests and is slidable.

6. A piepan of the character described comprising a shape retaining circular sheet metal rim adapted to shape and support the side walls of a pie baked in the pan, and a circular screen bottom to support the pie and permit air circulation to the bottom thereof, the lower edges of said sheet metal rim being bent inwardly, then downwardly and inwardly and upwardly to define a substantially horizontal annular shoulder on the bottom of the aforesaid rim with a supporting rim of U cross-section, the U section rim having the edges of the screen bottom inserted therein and clinched in place by compression of said section to secure the screen permanently in assembled relation to the rim.

7. A piepan of the character described comprising a main body frame of sheet metal formed to provide complete outwardly inclined upstanding side walls with an outwardly projecting rim on the upper edge, the bottom portion of said side walls being formed to provide an inwardly projecting substantially horizontal annular shoulder, and a wire mesh bottom for said pan disposed horizontally in substantially the same plane with said annular shoulder, the sheet metal at the inner edge of the annular shoulder being bent downwardly and inwardly and upwardly to define a supporting rim for the pan and also a means for securing the screen bottom, the outer edges of said screen bottom being secured thereto.

8. A piepan of the character described comprising a shape retaining circular sheet metal rim adapted to shape and support the side walls of a pie baked in the pan, a circular screen bottom to support the pie and permit air circulation to the bottom thereof, the aforesaid rim having an inturned bottom flange in a plane parallel to the plane of the screen bottom, and a combination pan-supporting rim and screen securing means comprising a U-shaped rim carried on said annular flange and having the outer edges of the screen bottom inserted therein and clinched in place by the closing thereof.

9. A piepan of the character described comprising a main body frame of sheet metal formed to provide complete outwardly inclined upstanding side walls with an outwardly projecting rim on the upper edge, the bottom portion of said side walls being formed to provide an inwardly projecting substantially horizontal annular shoulder, a wire mesh bottom for said pan in a plane parallel with said shoulder, and a combination supporting rim for the pan and clincher rim for fastening said wire mesh bottom, comprising an annular rim integral with the inner edge of said annular shoulder and bent so as to project below said shoulder for engagement with a supporting surface while enclosing and gripping in a fold thereof the marginal edge portion of the wire mesh bottom.

NETTIE C. McBIRNEY.